May 11, 1943.  J. YOUHOUSE  2,319,194
ELECTRIC MOTOR
Filed Dec. 5, 1941
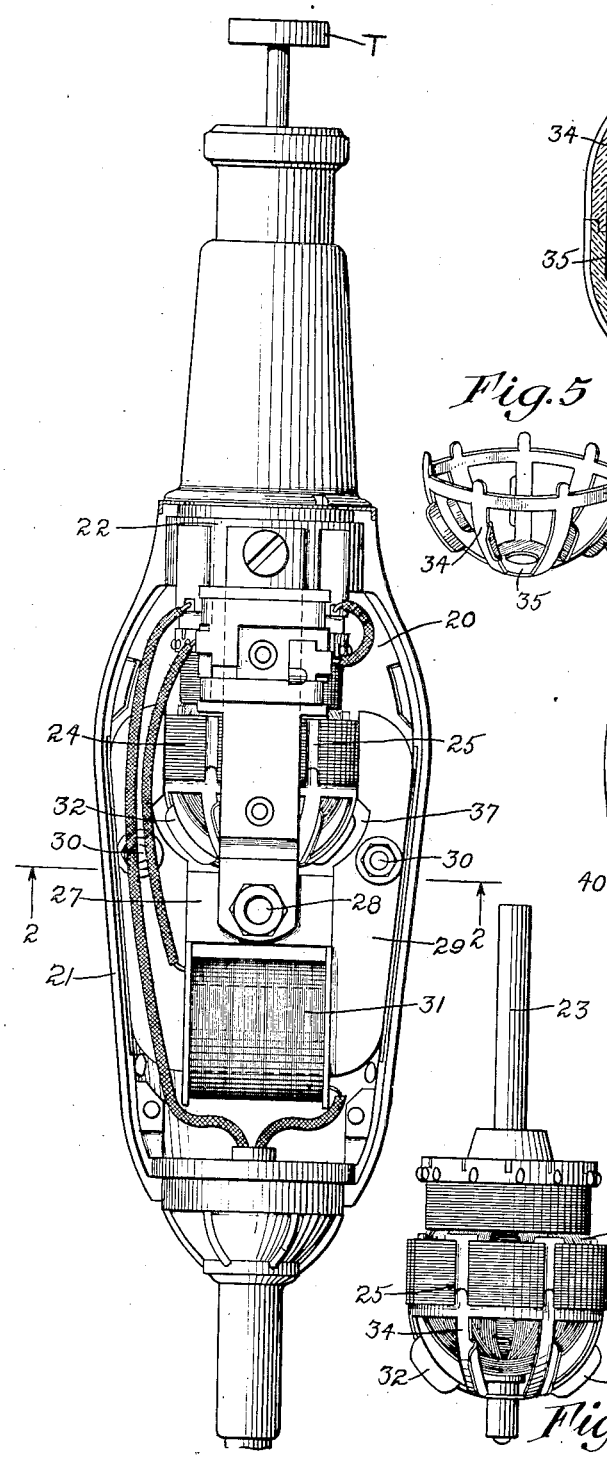
INVENTOR
Joseph Youhouse
BY Johnson, Klinting, Smyth
ATTORNEYS Patented May 11, 1943

2,319,194

UNITED STATES PATENT OFFICE 2,319,194

ELECTRIC MOTOR

Joseph Youhouse, Fairfield, Conn., assignor to Casco Products Corporation, Bridgeport, Conn., a corporation of Connecticut Application December 5, 1941, Serial No. 421,805

14 Claims. (Cl. 171—252)

This invention relates to electric motors, and, more particularly, to an improvement over the motor disclosed and claimed in my copending application, Serial No. 358,875, filed September 28, 1940, now Patent No. 2,277,264, issued on March 24, 1942.

In my said copending application, I have shown a motor in which a plurality of blades are frictionally anchored within the slots of the core of the armature and rotate therewith for cooling the motor. However, since the blades are individually mounted on the core of the armature, a separate operation is necessary to assemble each blade. This increases the time of assembly of the blades and armature, and, consequently, the assembly costs of the motor.

According to the present invention, the blades, although carried by and rotated with the armature, are tied together by a cage-like frame having a plurality of arms each having one end anchored in a slot of the armature core. The arms are integrally joined at the outer ends thereof and preferably are formed of good heat conducting material such as brass or copper for quickly conducting heat away from the core of the armature.

In the assembly of the armature of the present invention, as the blades are carried by the cage, the blades are assembled with the armature as a unit in a single operation. Thus, the multiplicity of operations necessary to assemble the blades with the armature of the motor as in my said copending application is obviated. The assembly costs of the motor of the present invention are, therefore, materially less than that of the motor of my copending application.

The blades, according to the present invention, are preferably carried by the arms intermediate the ends thereof, and, in the embodiment of the invention as now preferred, they are formed by striking up a portion of each arm.

Since they are integral with the arms, the blades in addition to setting up air drafts within the casing, also will act as fins for dissipating heat conducted by the arms from the armature core.

The blades struck up from the arms, which are shaped to conform to the windings of the armature and lie closely adjacent to the outer surface thereof, do not increase the overall dimension of the armature and the motor casing need not be enlarged to accommodate the blades.

The cage-like frame which carries the blades as it extends about the exposed end of the armature windings forms a shield for the same and materially reduces the danger of foreign objects, which might enter the casing, from contacting and injuring the windings of the armature.

The field structure of the motor, as disclosed herein, is formed with a substantially U-shaped field piece, the legs of which extend longitudinally of the casing and form with the same longitudinally extending channels in which the air may move.

The air, set in motion by the rotation of the blades, enters the casing through a number of inlet ports formed at one end thereof and is moved by the blades over the motor through the longitudinal channels formed by the field piece and thence out of the casing through discharge ports formed at the opposite end of the casing.

To prevent mere turbulence of air within the casing and to further direct air moved by the blades along the channels, the casing carries one or more baffles for directing the air drafts out of the casing through the discharge ports.

The motor of the present invention is particularly adapted for small portable tools in which the motor casing forms a handle by means of which the tool may be held in the hand by the user. As the motor is constantly cooled during operation, the casing will never become disagreeably warm to the hand of the user.

Other features and advantages will hereinafter appear.

In the accompanying drawing:

Figure 1 is an elevational view of the device of the present invention with a portion of the casing removed.

Fig. 2 is a sectional view of the device of the present invention taken along line 2—2.

Fig. 3 is an elevational view showing the interior side of one of the casing parts of the present invention.

Fig. 4 is an elevational view of the armature of the device of the present invention.

Fig. 5 is a perspective view showing the cage-like frame which carries the blades separated from the armature.

The present invention has been illustrated in conjunction with a motor driven tool holder comprising a subframe 20 adapted to carry the motor and the tool holder together with a two part casing 21 surrounding the subframe and motor and forming a handle for the device whereby it can be grasped and manipulated during use.

The motor shown, together with the subframe and casing, is disclosed and claimed in my copending application, Serial No. 222,123, filed July 30, 1938, now Patent No. 2,264,033, issued on November 25, 1941, and only such details of the motor, its subframe and the casing as is necessary to a full understanding of the present invention will be specifically recited here.

The subframe 20 is formed with an integral collar 22 provided with an axial bore carrying a bearing (not shown) for receiving the shaft 23 of an armature for driving the tool T. The armature comprises a laminated core 24 provided with a plurality of slots 25 receiving the usual windings of wire which form the armature coil 26. The opposite end of the shaft 23 is supported in a bearing (not shown) carried by a lug 27 extending transversely of the device and secured to the lower end of the subframe 20 by a screw 28. The field piece 29 of the motor is U-shaped and is secured to the subframe by a pair of screws 30. The field piece extends longitudinally of the axis of the device and carries at the bow thereof a field coil 31.

Any chuck or other tool holder may be mounted on the collar 22 of the subframe and, if desired, a tool holder, such as shown in the co-pending Cohen application, Serial No. 331,098, filed April 23, 1940, may be used.

In the use of motor driven hand held tools such as disclosed by the present invention, it has been found that in some work the motor will be overloaded and occasionally will become overheated. This tends to damage the motor and the heat developed by the motor may be such that it is uncomfortable or difficult to hold the casing in the hand.

To aid in keeping the motor cool, the present invention provides means for circulating air through the casing and over the armature and field so that heat developed therein is constantly dissipated while the motor is in operation.

In the broader aspects of the present invention, this might be accomplished by a number of different means, but in the form of the invention now preferred and as herein shown, this means comprises a plurality of blades 32 carried by a cage-like frame 33 mounted on the armature and rotated therewith. The frame is formed of a plurality of arms 34 each having one end thereof frictionally secured in one of the slots of the armature core. The arms are shaped to conform to the coil of the armature and lie closely adjacent to the outer surface of the same and hence do not increase the overall dimension of the motor.

The arms are rigidly and integrally joined at one end by a small disk 35 having a centrally located aperture for receiving the armature shaft 23 and at the opposite end by a band 36 which limits the insertion of the ends of the arms into the slots.

The frame 33, as it extends about the coil of the armature, forms a protective shield for the same and materially reduces the danger of foreign objects entering the casing and injuring the coil.

The blades may be mounted on the frame in any way desired, but, in the preferred embodiment of the invention, a portion of each arm is struck up to form a blade intermediate the ends of each arm. The blades also conform to the shape of the coil of the armature and do not increase the overall dimension of the armature and will freely revolve in the space 37 provided between the legs of the field piece and the armature. The arms preferably are formed of thin metal stock having good heat conducting properties and since they are in contact with the armature core they will conduct away and dissipate heat generated in the core. The blades, as they are integral with the arms, will also act as fins for dissipating heat conducted away from the armature core by the arms.

In the assembly of the armature of the present invention, the frame is mounted on the armature by inserting the armature shaft 23 through the aperture in the disk 35 of the frame and sliding the frame down the shaft until the free ends of the arms are received and frictionally held in the slots of the armature core. Thus, the blades are assembled as a unit with the armature in a single operation.

So as not to depend entirely upon friction, in some cases it may be desirable that the entire armature, after the frame has been assembled therewith, be coated with varnish or some similar material to adhesively attach the frame to the armature core.

When the armature is rotated, the blades draw air into the casing 21 through a plurality of inlet ports 38 formed in both parts of the casing and located about the field coil 31. The legs of the field piece, inasmuch as they extend longitudinally of the casing, form with the latter longitudinally extending channels through which the air may move when the armature is rotated. The air drawn into the casing through these ports is moved over the field coil and through the channels formed by the U-shaped field piece, over the armature and then out of the casing through exhaust ports 39 formed in the casing 21 adjacent the armature.

To insure that constantly moving air drafts are created within the casing and not merely a turbulence, the casing part has adjacent the exhaust ports baffles 40 for directing the air moved by the blades out through the exhaust ports.

The baffles may be attached to the casing part in any way desired, but, in the preferred form of the invention, at least a part thereof is formed integral with the casing part when the same is molded.

If a larger baffle is desired which cannot be economically molded integral with the casing, it may be provided by securing to the casing part a curved metal plate such as shown at 41. The baffles are so positioned on the interior wall of the casing that air set in motion by the blades will strike against the baffles and thence be directed through the exhaust ports.

The baffles formed integral with the casing part, in addition to directing the air set in motion by the blades, also tend to act as reinforcing ribs and strengthen the casing part of which they form an integral part.

Inasmuch as the motor is constantly cooled by air drafts moving thereover while the armature is revolving any heat caused by the motor being overloaded is dissipated, and, consequently, the motor of the present invention may be overloaded without resultant damage to the motor. Although the armature carries the cooling blades, it is not enlarged thereby and the casing of the motor may be kept small to the end that it may be conveniently held in the hand and used as a handle to manipulate the device during use thereof. Since the motor is constantly cooled during operation there is little likelihood of the casing becoming disagreeably warm to the hand of the user.

Variations and modifications may be made within the scope of this invention and portions of the improvements may be used without others.

I claim:

1. In a device of the type described, a motor including an armature comprising a slotted core wound with a plurality of turns of wire and a field magnet; a plurality of interconnected blades; and means integral with said blades and held within the slots of said core for securing the blades to said armature, said blades upon rotation of said armature moving air over the same and said field.

2. In a device of the type described, a motor including an armature comprising a slotted core wound with a plurality of turns of wire and a field magnet; a plurality of blades; means for interconnecting said blades; and means integral with said interconnecting means and held within the slots of said core for securing the latter to said armature, the blades moving air over said field and armature upon rotation of said armature.

3. In a device of the type described, a motor including an armature comprising a slotted core wound with a plurality of turns of wire and a field magnet; a plurality of arms of heat-conducting material each having an end anchored in a slot of said armature, said arms extending about an end of said armature and being integrally joined at the outer ends thereof; and a blade carried by each arm for moving air over said field and armature upon rotation of the latter.

4. In a device of the type described, a rotating armature having slots therein; a cage of heat-conducting material having means for insertion into said slots for mounting the cage on the armature for rotation therewith, said cage substantially conforming in shape to an end of the armature; and a plurality of blades carried by said cage for moving air over said armature and cage upon rotation of the armature.

5. In a device of the type described, a rotating wire-wound armature, a substantially dome-shaped shield having means for frictionally engaging said armature and mounting the shield thereon for rotation therewith, said shield surrounding the windings projecting from one end thereof; and a plurality of air-impelling blades carried by said shield, said shield having apertures therein exposing the major portion of the windings whereby the air may contact and cool said windings.

6. In a device of the type described, a motor including an armature comprising a slotted core wound with a plurality of turns of wire and a field magnet; a plurality of arms of heat-conducting material integrally joined at one end thereof, each arm having an end thereof anchored in a slot of said core and conducting heat away from said core; means for integrally joining said arms at the outer ends thereof; and a blade carried by each arm for setting up convection currents to further cool said armature and to dissipate heat conducted away from said core by said arms.

7. In a device of the type described, a casing; a motor housed by said casing, said motor including an armature having a core wound with a plurality of turns of wire forming a coil having a portion disposed at an end of the core; means frictionally secured to said core for rotation therewith and overlying the said portion of the coil for shielding the latter against injury; and blades carried by said last-named means for creating air drafts within said casing upon rotation of said armature for cooling said motor, said last-named means including means engaging the core periphery for mounting the last-named means on the core for rotation therewith.

8. In a device of the type described, a casing; a motor housed by said casing, said motor comprising an armature having a core wound with a plurality of turns of wire forming a coil having a portion exposed at the end of the core; a reticulated member slidable on and frictionally held to said core and forming a cage-like shield for the exposed portion of said coil; and a plurality of blades carried by said member for drawing air upon rotation of the armature over the same and through said member for dissipating heat generated by said motor.

9. In a device of the type described, a casing; a motor housed by said casing, said motor comprising an armature having a core wound with a plurality of turns of wire forming a coil having an exposed end portion; a reticulated member slidably mounted on said core and forming a cage-like shield for said exposed end of the coil, said casing having air inlet and discharge ports formed adjacent each end thereof; a plurality of blades carried by said member for drawing air into said casing through the said inlet ports and over said armature and through said member upon rotation of the armature; and baffles formed contiguous to said discharge ports for directing air to the same after the air has passed over said armature and through said member.

10. In a device of the type described, a casing; a motor housed by said casing, said motor comprising a wire wound armature and an elongated field magnet extending longitudinally of said casing and forming therewith a plurality of longitudinally extending channels within the same; inlet ports formed in said casing adjacent one end thereof; a cage of heat-conducting material secured to said armature and overlying the windings thereof; a plurality of blades carried by said cage for drawing air into said casing through the inlet ports and moving the same along said channels and over the field magnet and through the cage and over the armature of the motor to cool the same upon rotation of said armature; and exhaust ports formed in the opposite end of said casing whereby said air may be discharged from said casing.

11. In a device of the type described, a casing; a motor housed by said casing, said motor comprising a wire wound armature and an elongated field magnet extending longitudinally of said casing and forming therewith a plurality of longitudinally extending channels within the same, said casing having a plurality of ports formed adjacent each end thereof; a cage comprising a plurality of interconnected bars of heat-conducting material carried by said armature and surrounding the windings of the same and forming a shield therefor; a plurality of blades carried by longitudinally extending bars of said cage for drawing air into said casing through one set of ports and moving the same along said channels and over the field magnet and through the cage and over the armature upon rotation of the latter; and a plurality of baffles carried within said casing adjacent the opposite end thereof for directing the air out of said casing through the other of said ports.

12. In an electric motor, a rotating armature having slots therein; a cage member at one end of said armature having means for insertion into said slots for mounting said member on the armature for rotation therewith; and a plurality of propelling means carried by said member for moving a cooling medium over the armature upon rotation of said armature.

13. In an electric motor, a rotating armature having cage-receiving means thereon; a cage having means to cooperate with the cage-receiving means on the armature to mount the cage thereon for rotation therewith; and means on said cage for propelling air, upon rotation of said armature, through said cage to said armature and over the sides of the armature.

14. In an electric motor, a rotating armature having cage-receiving means thereon; a cage having means to cooperate with the cage-receiving means on the armature to mount the cage thereon for rotation therewith; and means on said cage for propelling air, upon rotation of said armature, through said cage to said armature and over the sides of the armature, said cage and means thereon for propelling air having a diameter not greater than that of the diameter of the armature and closely overlying the end thereof whereby the size of the motor is not increased thereby.

JOSEPH YOUHOUSE.